(12) United States Patent
Rai

(10) Patent No.: US 8,910,305 B1
(45) Date of Patent: Dec. 9, 2014

(54) METHOD AND APPARATUS FOR ANALYZING MOUSE CURSOR PATH

(71) Applicant: CA, Inc., Islandia, NY (US)

(72) Inventor: Vinay Kumar Rai, Bangalore (IN)

(73) Assignee: CA, Inc., Islandia, NY (US)

( * ) Notice: Subject to any disclaimer, the term of this patent is extended or adjusted under 35 U.S.C. 154(b) by 8 days.

(21) Appl. No.: 13/803,257

(22) Filed: Mar. 14, 2013

(51) Int. Cl.
| | |
|---|---|
| *G06F 21/00* | (2013.01) |
| *H04L 29/06* | (2006.01) |
| *G06F 21/55* | (2013.01) |
| *G06F 3/0338* | (2013.01) |

(52) U.S. Cl.
CPC .............. *G06F 21/55* (2013.01); *G06F 3/0338* (2013.01); *H04L 63/308* (2013.01)
USPC .................................. 726/28; 726/23; 726/25

(58) Field of Classification Search
None
See application file for complete search history.

(56) References Cited

U.S. PATENT DOCUMENTS

| | | | |
|---|---|---|---|
| 7,013,393 B1 * | 3/2006 | Stevens .............................. | 726/9 |
| 2009/0024460 A1 * | 1/2009 | Willner et al. ................... | 705/14 |
| 2012/0092252 A1 * | 4/2012 | Su et al. ......................... | 345/157 |

* cited by examiner

*Primary Examiner* — Hadi Armouche
*Assistant Examiner* — Andrew Steinle
(74) *Attorney, Agent, or Firm* — Coats & Bennett, P.L.L.C.

(57) ABSTRACT

A computer implemented method comprises determining two or more line segments of a mouse cursor path, determining a slope of each of the two or more line segments, and determining whether the mouse cursor path represents a program simulating mouse movement based on a comparison of the values of the determined slopes. A computing device and computer program product implementing similar features are also disclosed.

18 Claims, 6 Drawing Sheets

METHOD AND APPARATUS FOR ANALYZING MOUSE CURSOR PATH

TECHNICAL FIELD

The present disclosure relates to analyzing a mouse cursor path, and more specifically to determining whether a mouse cursor path represents a program simulating mouse movement.

BACKGROUND

As Internet usage continues to expand, security continues to be a concern. Schemes such as "phishing," whereby a party attempts to acquire confidential information from a user by masquerading as a trustworthy entity, are becoming commonplace. Other schemes, such as voice phishing ("vishing"), are also becoming common. Malevolent parties have been known to use automated hacking tools for such schemes to target users of a given website. For example, a malevolent party wishing to steal online banking information for a given bank may carefully probe the bank's website, and then subsequently launch an attack, possibly using data obtained through a phishing scheme.

SUMMARY

According to one aspect of the present disclosure, a computer-implemented method comprises determining two or more line segments of a mouse cursor path, determining a slope of each of the two or more line segments, and determining whether the mouse cursor path represents a program simulating mouse movement based on a comparison of the values of the determined slopes.

According to another aspect of the present disclosure, a computing device comprises a communications interface and a controller. The communications interface is configured to receive a mouse cursor path originating from a remote computing device. The controller is configured determine two or more line segments of the mouse cursor path, determine a slope of each of the two or more line segments, and determine whether the mouse cursor path represents a program simulating mouse movement based on a comparison of the values of the determined slopes.

According to another aspect of the present disclosure, a computer program product comprises a computer readable storage medium having computer readable program code embodied therewith. The computer readable program code comprises computer readable program code configured to determine two or more line segments of a mouse cursor path, and computer readable program code configured to determine a slope of each of the two or more line segments. The computer readable program code further comprises computer readable program code configured to determine whether the mouse cursor path represents a program simulating mouse movement based on a comparison of the values of the determined slopes.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
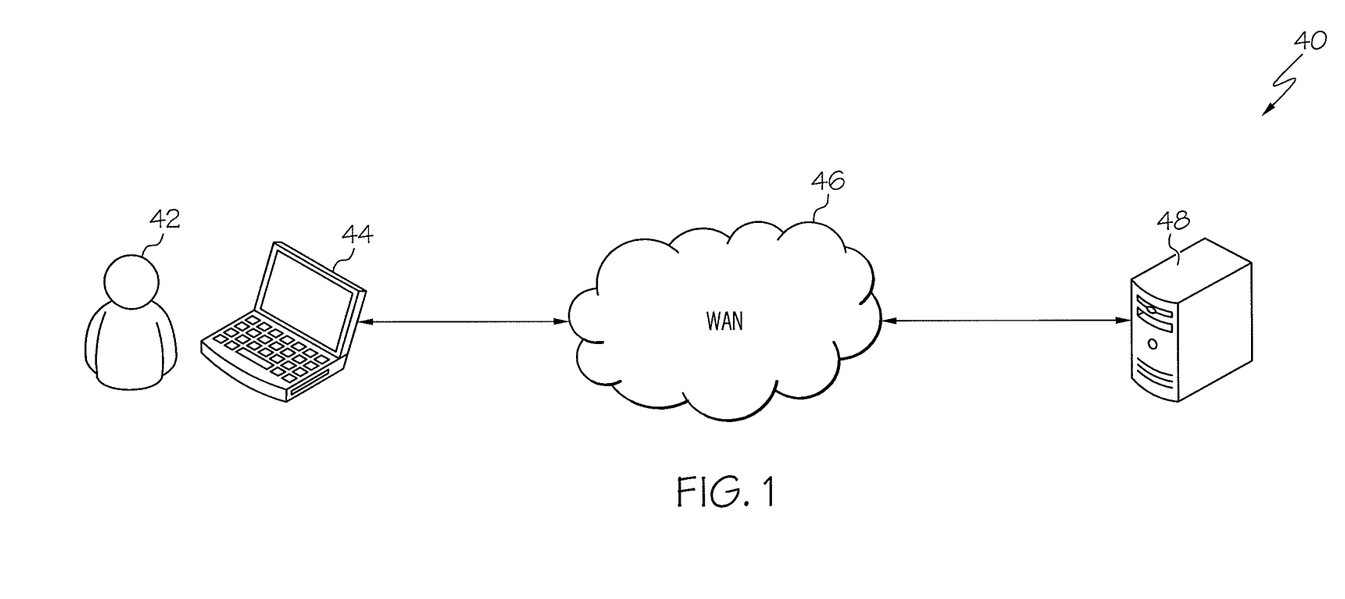
FIG. 1 illustrates an example system for receiving and analyzing a mouse cursor path.

FIG. 1 illustrates an example system 40 for receiving and analyzing a mouse cursor path. A user 42 operates a computing device 44 to access a wide area network (WAN) 46, such as the Internet. In one or more embodiments the WAN 46 is used to access a website hosted on a web server 48. When accessing the website, the user 42 provides a mouse cursor path through their respective computing device 44. In this context, "mouse" can refer to any of a traditional mouse or trackball (e.g., attached to a desktop computer), a touchpad (e.g., on a laptop computer), or a stylus (e.g., on a display of a tablet computer or PDA), for example. In one or more embodiments, the mouse cursor path is used to navigate from a start point through a plurality of intermediate points to an end point, where the start point and end point correspond to actuation areas of a first input element and a second input element on the website (e.g., clickable buttons).

Figure 2:
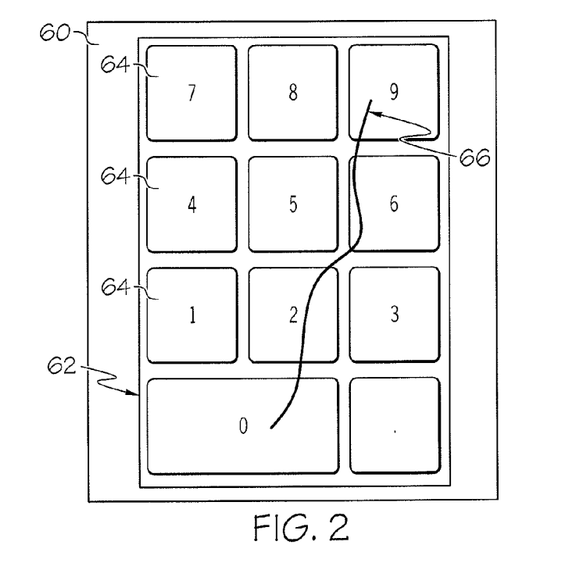
FIG. 2 illustrates an example mouse cursor path representing actual movement of a mouse by a user.

FIG. 2 illustrates an example mouse cursor path 66 on a website 60, with the mouse cursor path 66 representing actual movement of a mouse by the user 42. As shown in FIG. 2, the website 60 includes a keypad 62 for entering numbers (e.g., for a website login). The keypad 62 includes a plurality of input elements 64, each indicating a number. The mouse cursor path 66 spans from the "0" button to the "9" button. The mouse cursor path 66 is not a straight line, but rather follows a somewhat winding, tortuous path between the "0" and the "9" inputs. When a human operates a mouse it is very difficult to follow a straight line between input elements, and this is evident in the mouse path 66.

Figure 3:
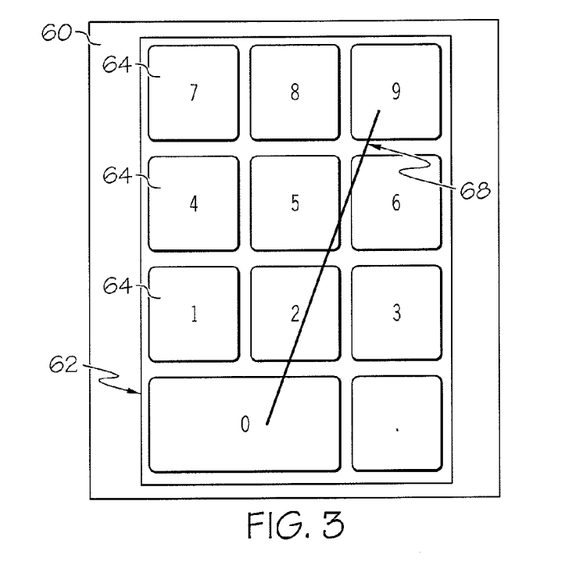
FIG. 3 illustrates an example mouse cursor path representing a program simulating mouse movement.

FIG. 3 illustrates another example mouse cursor path 68 on the website 60, with the mouse cursor path 68 representing simulated mouse movement and not actual movement of a mouse by the user 42. As shown in FIG. 3, the mouse cursor path 68 spans from the "0" input to the "9" input, but is a very straight line extending directly between the "0" and "9" input elements 64, and does not follow a winding path. Such a mouse path 68 is very unlikely to be provided by a human, and is much more likely to be provided by an automated program spoofing actual mouse movement.

For a website serving as a gateway to highly secure information, such as personal banking data, it is desirable to determine whether mouse cursor data from a given computing device is being provided by an actual user, or by an automated program that is spoofing a user.

Figure 4:
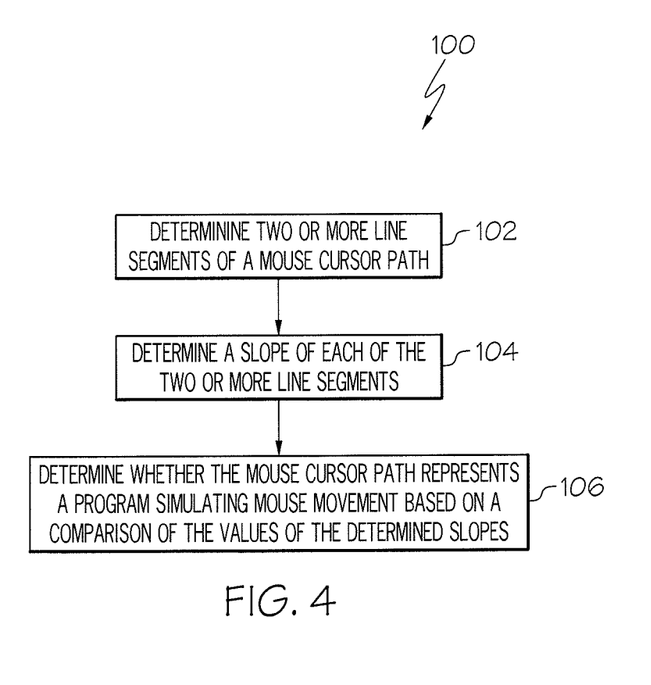
FIG. 4 illustrates a computer-implemented method for analyzing a mouse cursor path.

FIG. 4 illustrates a computer-implemented method 200 for performing such a determination by analyzing slopes of line segments of a mouse cursor path. The method 100 of FIG. 4 is implemented by a computer (e.g., web server 48). The computer determines two or more line segments of a mouse cursor path (block 102), determines a slope of each of the two or more line segments (block 104), and determines whether the mouse cursor path represents a program simulating mouse movement based on a comparison of the values of the determined slopes (block 106).

Figure 2A:
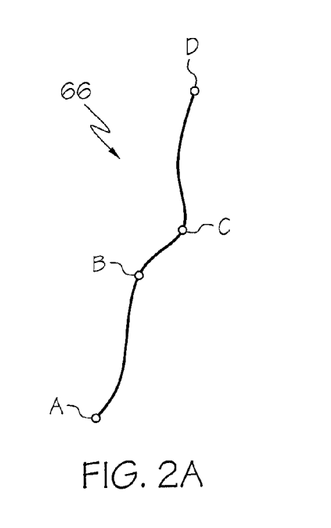
FIG. 2A illustrates the mouse cursor path of FIG. 2.

An embodiment of the method 100 will be described in the context of FIG. 2A, which illustrates the mouse cursor path 66 of FIG. 2. As shown in FIG. 2A, the cursor path 66 includes start point A, end point D, and intermediate points B and C, having the coordinate data shown in table 1 below. The following line segments are determined for the cursor path 66: AB, BC, CD and AD (block 102). Slopes are determined for each of these line segments as shown in equations 1-5 below (block 104).

TABLE 1

| Point | X Coordinate | Y Coordinate |
|---|---|---|
| A | 268 | 74 |
| B | 302 | 171 |
| C | 338 | 210 |
| D | 352 | 305 |

$$m = \frac{y_2 - y_1}{x_2 - x_1} \qquad \text{equation \#1}$$

where m is the slope of a line segment;

y₂ and y₁ are the y-axis coordinates of line segment end points; and x₂ and x₁ are the y-axis coordinates of the line segment end points.

$$m_{AB} = \frac{y_B - y_A}{x_B - x_A} = \frac{100}{34} = 2.94 \quad \text{equation \#2}$$

$$m_{BC} = \frac{y_C - y_B}{x_C - x_B} = \frac{39}{36} = 1.08 \quad \text{equation \#3}$$

$$m_{CD} = \frac{y_D - y_C}{x_D - x_C} = \frac{95}{14} = 6.78 \quad \text{equation \#4}$$

$$m_{AD} = \frac{y_D - y_A}{x_D - x_A} = \frac{231}{84} = 2.75 \quad \text{equation \#5}$$

A determination is then made as to whether the mouse cursor path 66 represents a program simulating mouse movement based on a comparison of the values of the determined slopes (block 106). In this embodiment, this involves comparing the values of the determined slopes, and determining that the mouse cursor path represents actual movement of a mouse by a user based on the comparison indicating that two of the determined slopes have values whose difference exceeds a difference threshold. For the examples of FIGS. 2 and 3 we will assume that the difference threshold is ±0.3. Using this example difference threshold, the difference between any of the slopes clearly exceeds the difference threshold. Therefore, the computer determines that the mouse path 66 represents actual movement of a mouse by a user.

Figure 3A:
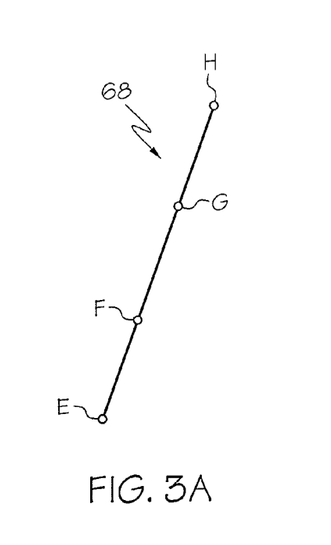
FIG. 3A illustrates the mouse cursor path of FIG. 3.

An embodiment of the method 100 will be described in the context of FIG. 3A, which illustrates the mouse cursor path 68 of FIG. 3. As shown in FIG. 3A, the cursor path 68 includes start point E, end point H, and intermediate points F and G, each having the coordinate data shown in table 2 below. The following line segments are determined for the cursor path 66: EF, FG, GH and EH (block 102). Slopes are determined for each of these line segments as shown in equations 6-9 below (block 104).

TABLE 2

| Point | X Coordinate | Y Coordinate |
|-------|--------------|--------------|
| E     | 268          | 74           |
| F     | 296          | 151          |
| G     | 324          | 228          |
| H     | 352          | 305          |

$$m_{EF} = \frac{y_F - y_E}{x_F - x_E} = \frac{77}{28} = 2.75 \quad \text{equation \#6}$$

$$m_{FG} = \frac{y_G - y_F}{x_G - x_F} = \frac{77}{28} = 2.75 \quad \text{equation \#7}$$

$$m_{GH} = \frac{y_H - y_G}{x_H - x_G} = \frac{77}{28} = 2.75 \quad \text{equation \#8}$$

$$m_{EH} = \frac{y_H - y_E}{x_H - x_E} = \frac{231}{84} = 2.75 \quad \text{equation \#9}$$

A determination is then made as to whether the mouse cursor path 66 represents a program simulating mouse movement based on a comparison of the values of the determined slopes (block 106). In this embodiment, this involves comparing the values of the determined slopes, and determining that the mouse cursor path represents a program simulating mouse movement based on the comparison indicating that the determined slopes have the same value, or that a greatest difference between the determined slopes does not exceed a difference threshold. Here there is no need to consider the difference threshold, because each of the slopes is equal.

Figure 5:
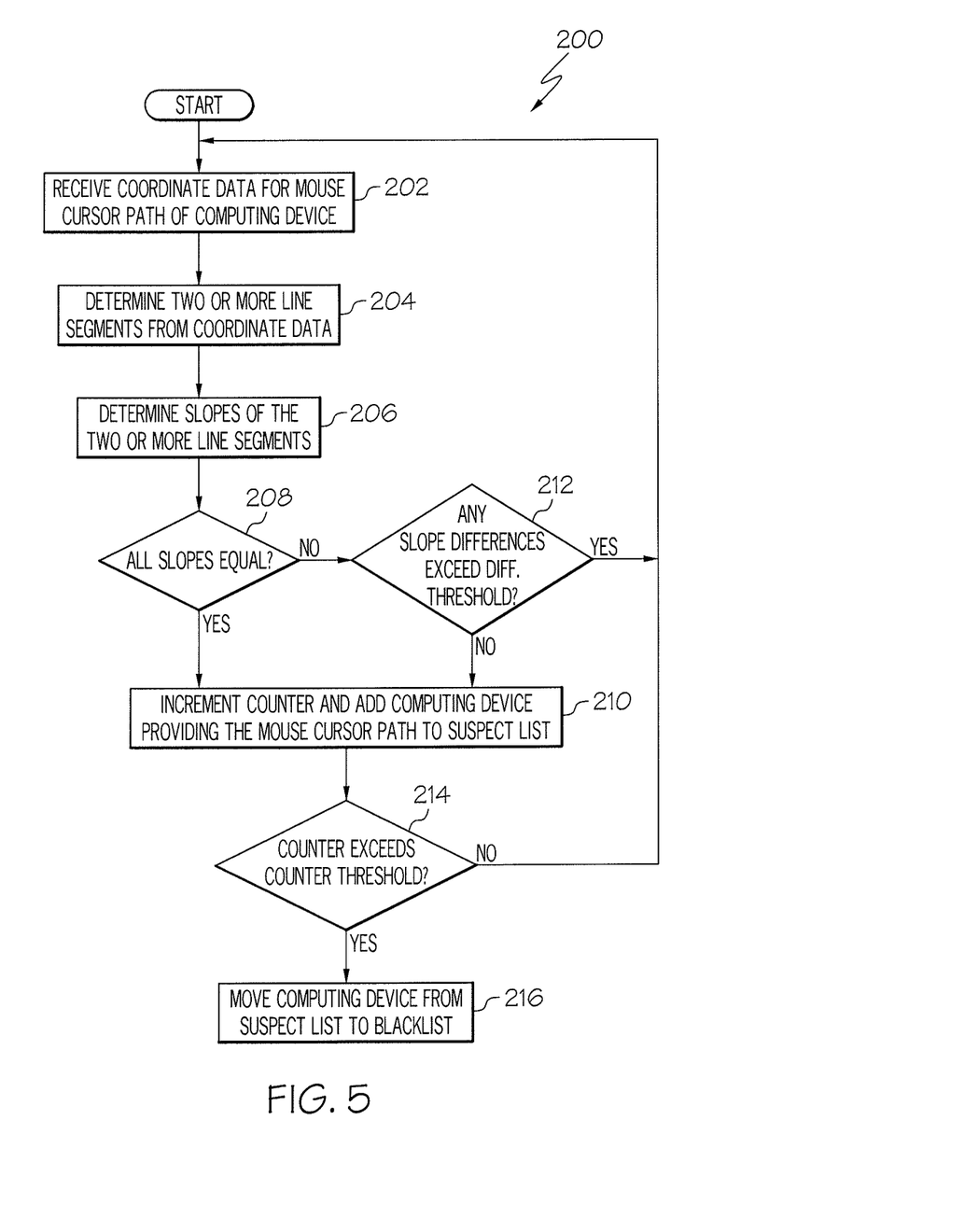
FIG. 5 illustrates an example embodiment of the method of FIG. 4.

FIG. 5 illustrates a method 200 representing an example embodiment of the method 100 of FIG. 4, in which a counter is implemented before making a determination that a mouse cursor path represents a program simulating actual mouse movement, and in which multiple mouse cursor paths are analyzed over an observation period. Coordinate data is received for a mouse cursor path of a remote computing device (e.g., computing device 44) (block 202). Two or more line segments are determined from the coordinate data (block 204), and slopes of the two or more line segments are determined (block 206). A check is performed to determine if all of the slopes are equal (block 208), and if they are all equal then a counter is incremented and the computing device is added to a "suspect list" (block 210). If the computing device is already on the suspect list then the counter is incremented, and the computing device remains on the suspect list.

If all of the slopes are not equal, then a determination is made if the difference between any of the slopes exceeds the difference threshold (block 212). If any difference between the slopes exceeds the difference threshold, then the method returns to step 202 for collecting more cursor path coordinate data. Otherwise, if none of the slope differences exceeds the difference threshold, then step 210 is performed, and a check is performed to determine if the counter exceeds a counter threshold (block 214). If the counter threshold is not exceeded, then the method proceeds to step 202 for analyzing more cursor data. However, if the counter threshold is exceeded, then the computing device is moved from the suspect list to a "blacklist" where, for example, the IP address of the computing device from which the mouse cursor path originates (e.g., computing device 44) is blocked by the web server 48 as a security action (block 216).

Alternatively, because IP addresses can easily be changed for a given computing device, in one or more embodiments the security action blocks the computing device instead of just the IP address, by setting a cookie or a flash object stored on the computing device, which are transmitted to the web server 48 with every request originating from the computing device, thereby allowing the web server 48 to remember that this is a blacklisted device. In the same or another embodiment, other security actions include using various attributes on the computing device to identify the device correctly. In the same or another embodiment, other security actions include providing an alert to the user of the offending computing device and/or to a party monitoring network usage of the WAN 46. Of course, the security actions discussed above are not limited to the embodiment of FIG. 5, and could be implemented in the other embodiments discussed herein.

Referring again to FIG. 5, the suspect list indicates that the web server 48 suspects that the cursor path being analyzed represents a program simulating actual mouse movement, and not actual movement of a mouse from user, and the blacklist represents a definitive determination that the mouse cursor path represents a program simulating actual mouse movement. Use of the counter and suspect list can be useful to prevent false-positive identifications of a program simulating mouse movement. For example, if a user accidentally moves their mouse in a very straight line on one occasion, but all other times during an observation period uses mouse cursor paths having slopes who vary (i.e., a difference between slope values exceeds the difference threshold) then the web server 48 can avoid identifying an actual human user as a simulated user.

Optionally an observation period may be used for analyzing mouse cursor paths. In one or more embodiments an observation period is used to analyze all users, or to analyze users randomly. In some embodiments the counter may be reset at the end of the observation period if a given computing device remains on the suspect list but has not yet been moved to the blacklist.

Figure 6:
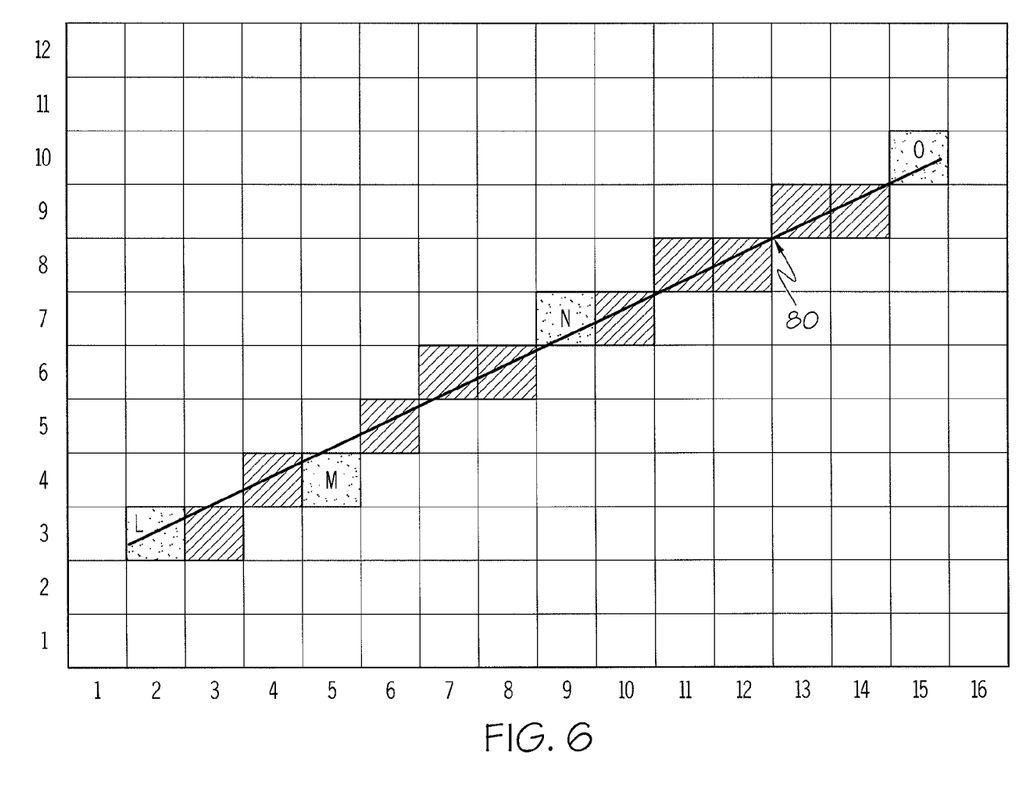
FIG. 6 illustrates another example mouse cursor path.

Use of the difference threshold can accommodate pixel estimations that are inherent in representing a cursor path. Because computer electronic displays use a grid of pixels, it is often necessary to approximate a pixel corresponding to a given cursor path. FIG. 6 illustrates an example a mouse cursor path 80 that demonstrates this principle. The mouse cursor path 80 represents a straight line, and is therefore highly unlikely to be provided by a human user. The cursor path 80 spans from point L having coordinates (2,3) to point O having coordinates (15,9). The slope of line segment LM, MN, NO and LO are shown below:

$m_{LM}$=0.333
$m_{MN}$=0.75
$m_{NO}$=0.5
$m_{LO}$=0.538

One may expect these slopes to all be exactly equal, but due to pixels being an approximation of a cursor path coordinate (e.g., whether point M should have coordinates of (5,4) or (5,5)) variation is introduced into the slopes of the line segments of the cursor path 80. Use of the difference threshold can accommodate these variations. Another way to mitigate pixel estimation issues is to use a minimum line segment length, as these variations are much less significant for longer line segments. Yet another way to ensure accuracy and prevent false-positive detections of a program simulating mouse movement is to use a minimum number of intermediate points on a mouse cursor path could be used. Measures such as these, either alone or in combination, can help reduce false-positive determinations that a given mouse cursor path represents a program simulating mouse movement and not actual movement of a mouse.

Figure 7:
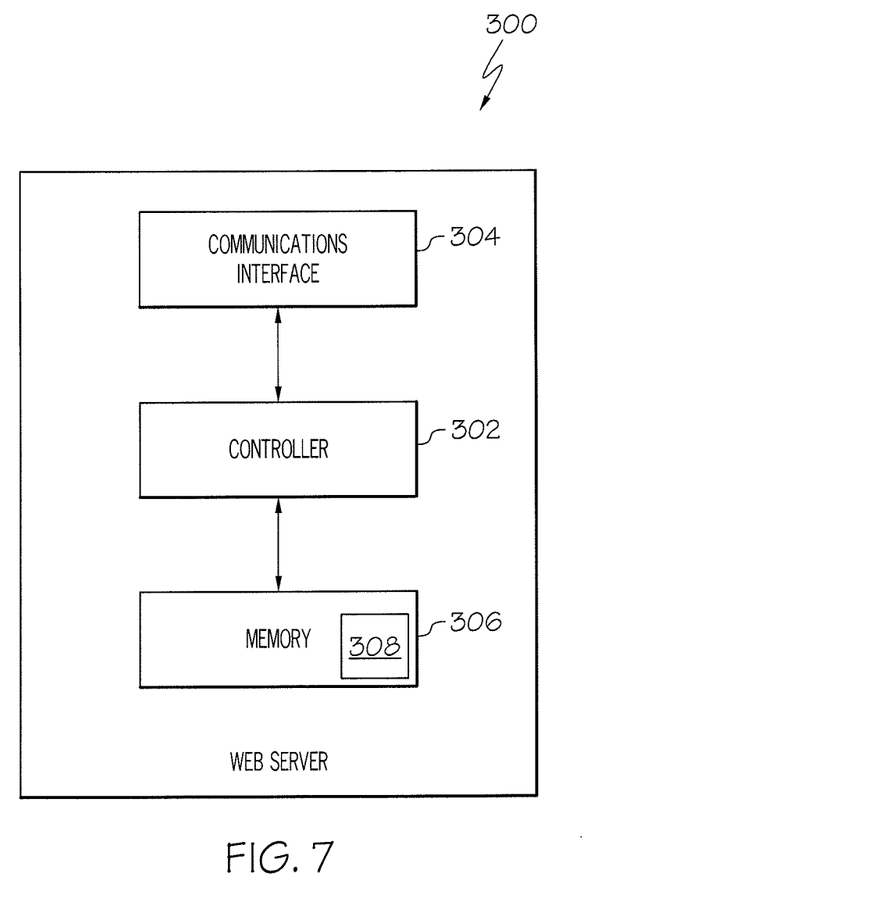
FIG. 7 illustrates a computing device configured as a web server.

FIG. 7 illustrates a computing device 300 configured as a web server (e.g., web server 48 of FIG. 1). The computing device 300 includes a controller 302, a communications interface 304, and a computer-readable storage medium (shown as "memory" 306). The communications interface 304 is configured to receive a mouse cursor path originating from a remote computing device (e.g., computing device 44). The controller 302 is configured to determine two or more line segments of the mouse cursor path, determine a slope of each of the two or more line segments, and determine whether the mouse cursor path represents a program simulating mouse movement or actual movement of a mouse by a user based on a comparison of the values of the determined slopes according to one or more of the embodiments discussed above. The memory 306 stores websites hosted by the computing device 300, and optionally also stores a computer program product 308 comprising computer readable program code operative to configure the computing device 300 as described above.

The embodiments discussed above offer a number of advantages over the prior art. Prior art user-spoofing detection methods have required historical analysis of user browsing behavior and click patterns. Unlike those methods, the embodiments described above can analyze a mouse cursor path in real-time (and optionally to perform the real-time analysis multiple times over an observation period). Therefore, the previously required historical knowledge of user browsing behavior and click patterns is not required.

The embodiments described above can be useful for web sites wishing to identify suspect browsing. Upon detecting that a given mouse cursor path represents program simulating mouse movement, an IP address from which the cursor path originated can be added to a suspect list, or a blacklist, as described above. In the past, some malevolent parties have browsed a target website for a long time (e.g., days or months) to "analyze" the website before launching a final attack. The embodiments described above can help flag such malevolent parties if automated programs are being used to perform browsing. This can be particularly useful for websites such as those providing online banking, which may have many tens of thousands of visitors daily. The embodiments described above can help detect fraudulent users of such websites in an efficient manner, while permitting actual human users to continue using the website.

Although mouse cursor path analysis has been described as occurring within the context of a website, it is understood that this is only a non-limiting example, as the analysis could be applied to many computing scenarios. Moreover, although the determination of line segments has been described in the examples above as defining a line segment between the start and end points, and between each of the plurality of points and its next closest point, it is understood that this too is only a non-limiting example. In the embodiment of FIG. 2A, for example, an acceptable outcome could be obtained by comparing only line segments AB and BC and not considering line segments AB and CD.

In one or more embodiments the difference threshold is derived from the longest line segment of a cursor path (e.g., the line segment between the start and end points), or a shortest line segment of the cursor path (e.g., as percentage of the determinative line segment, or based on a slope variation introduced by ±1 pixel margin of error when determining different possible slope values). Referring to the line segment $m_{FG}$ discussed above (FIG. 3A), it had a value of 77/28=2.75. However if we assume that the pixel coordinates have a ±1 pixel margin of error, then this value could span from 79/26=3.03 to 75/30=2.5. The difference between 3.03 and 2.75 is 0.28, so a margin of ±0.3 could be used. Of course, there are other possible ways of implementing the difference threshold. For example, a statistical property could be used, such as a variance between the determined slopes.

Additionally, the present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   determining a set of line segments from a mouse cursor path that extends from a start point to an end point, wherein the set includes two or more separate line segments that collectively span the entire mouse cursor path from the start point to the end point, and that each connect different points along the mouse cursor path, wherein each of the line segments in the set has a length that meets or exceeds a minimum length threshold, and wherein the mouse cursor path originates from a remote computing device;
   determining a slope of each of the line segments in the set;
   comparing the values of the determined slopes; and
   if a greatest difference between the determined slopes does not exceed a difference threshold:
      repeating said determining a set of two or more line segments of a mouse cursor path, determining a slope of each of the line segments in the set, and comparing the values of the determined slopes for each of a plurality of mouse cursor paths originating from the remote computing device;
      incrementing a counter each time that a greatest difference between the determined slopes for a given one of the plurality of mouse cursor paths does not exceed the difference threshold; and
      determining that the plurality of mouse cursor paths for the computing device represent a program simulation of mouse movement based on the counter exceeding a counter threshold.

2. The computer-implemented method of claim 1, further comprising:
   determining that a given one of the mouse cursor paths represent actual movement of a mouse by a user based on the comparing indicating that two of the determined slopes for the given one of the plurality of mouse cursor paths have values whose difference exceeds the difference threshold.

3. The computer-implemented method of claim 1, further comprising:
   performing a security action responsive to the determination that the mouse cursor paths represent a program simulation of mouse movement.

4. The computer-implemented method of claim 3:
   wherein the mouse cursor paths originate from a remote computing device that uses a website; and
   wherein the security action comprises blocking the remote computing device from accessing the website.

5. The computer-implemented method of claim 1, wherein determining the set of line segments of a given one of the mouse cursor paths comprises:
   receiving coordinates for a plurality of points of the given mouse cursor path, the plurality of points including a start point, an end point, and at least one intermediate point; and
   determining line segments between the start and end points, and between each of the plurality of points and its next closest point.

6. The computer-implemented method of claim 1:
   wherein a start point of each mouse cursor path resides within an actuation area of a first input element of a website; and
   wherein an end point of each mouse cursor path resides within an actuation area of a different second input element of the website.

7. A computing device comprising:
   a communications interface configured to receive a mouse cursor path that originates from a remote computing device, wherein the mouse cursor path extends from a start point to an end point; and
   a controller circuit configured to:
      determine a set of line segments from the mouse cursor path, wherein the set includes two or more separate line segments that collectively span the entire mouse cursor path from the start point to the end point, and that each connect different points along the mouse cursor path, wherein each of the line segments in the set has a length that meets or exceeds a minimum length threshold, and wherein the mouse cursor path originates from a remote computing device;
      determine a slope of each of the line segments in the set;
      compare the values of the determined slopes; and
      if a greatest difference between the determined slopes does not exceed a difference threshold:
         repeat said determination of a set of two or more line segments of a mouse cursor path, determination of a slope of each of the line segments in the set, and comparison of the values of the determined slopes for each of a plurality of mouse cursor paths that are received through the communications interface and that originate from the remote computing device;
         increment a counter each time that a greatest difference between the determined slopes for a given one of the plurality of mouse cursor paths does not exceed the difference threshold; and determine that the plurality of mouse cursor paths for the computing device represent a program simulation of mouse movement based on the counter exceeding a counter threshold.

8. The computing device of claim 7, wherein the controller circuit is further configured to:
  determine that a given one of the mouse cursor paths represent actual movement of a mouse by a user based on the comparisons indicating that two of the determined slopes for the given one of the plurality of mouse cursor paths have values whose difference exceeds the difference threshold.

9. The computing device of claim 7, wherein the controller circuit is further configured to:
  perform a security action responsive to the determination that the mouse cursor paths represent a program simulation of mouse movement.

10. The computing device of claim 9:
  wherein the mouse cursor paths originate from a remote computing device that uses a website; and
  wherein to perform the security action, the controller circuit is configured to block the remote computing device from accessing the website.

11. The computing device of claim 7, wherein to determine the set of line segments of a given one of the mouse cursor paths, the controller circuit is configured to:
  receive coordinates for a plurality of points of the given mouse cursor path, the plurality of points including a start point, an end point, and at least one intermediate point; and
  determine line segments between the start and end points, and between each of the plurality of points and its next closest point.

12. The computing device of claim 7:
  wherein a start point of each mouse cursor path resides within an actuation area of a first input element of a website; and
  wherein an end point of each mouse cursor path resides within an actuation area of a different second input element of the website.

13. A computer program product comprising:
  a non-transitory computer readable storage medium having computer readable program code embodied therewith, the computer readable program code comprising:
    computer readable program code configured to determine a set of line segments from a mouse cursor path that extends from a start point to an end point, wherein the set includes two or more separate line segments that collectively span the entire mouse cursor path from the start point to the end point, and that each connect different points along the mouse cursor path, wherein each of the line segments in the set has a length that meets or exceeds a minimum length threshold, and wherein the mouse cursor path originates from a remote computing device;
    computer readable program code configured to determine a slope of each of the line segments in the set; and
    computer readable program code configured to compare the values of the determined slopes; and
    computer readable program code configured to, if a greatest difference between the determined slopes does not exceed a difference threshold:
      repeat said determination of a set of two or more line segments of a mouse cursor path, determination of a slope of each of the line segments in the set, and comparison of the values of the determined slopes for each of a plurality of mouse cursor paths originating from the remote computing device;
      increment a counter each time that a greatest difference between the determined slopes for a given one of the plurality of mouse cursor paths does not exceed the difference threshold; and
      determine that the plurality of mouse cursor paths for the computing device represent a program simulation of mouse movement based on the counter exceeding a counter threshold.

14. The computer program product of claim 13, wherein the computer readable program code further comprises:
  computer readable program code configured to determine that a given one of the mouse cursor paths represent actual movement of a mouse by a user based on the comparison indicating that two of the determined slopes for the given one of the plurality of mouse cursor paths have values whose difference exceeds the difference threshold.

15. The computer program product of claim 13, wherein the computer readable program code further comprises:
  computer readable program code configured to perform a security action responsive to the determination that the mouse cursor paths represent a program simulation of mouse movement.

16. The computer program product of claim 15
  wherein the mouse cursor paths originate from a remote computing device that uses a website; and
  wherein the computer readable program code configured to perform a security action comprises computer readable program code configured to block the remote computing device from accessing the website.

17. The computer program product of claim 13, wherein the computer readable program code configured to determine the set of line segments of a given one of the mouse cursor paths comprises:
  computer readable program code configured to receive coordinates for a plurality of points of the given mouse cursor path, the plurality of points including a start point, an end point, and at least one intermediate point; and
  computer readable program code configured to determine line segments between the start and end points, and between each of the plurality of points and its next closest point.

18. The computer program product of claim 13:
  wherein a start point of each mouse cursor path resides within an actuation area of a first input element of a website; and
  wherein an end point of each mouse cursor path resides within an actuation area of a different second input element of the website.

* * * * *